US010620356B1

(12) United States Patent
Beauchamp

(10) Patent No.: US 10,620,356 B1
(45) Date of Patent: Apr. 14, 2020

(54) FIBER OPTIC PANEL HAVING EXTENDED ABRASION

(71) Applicant: VALEO NORTH AMERICA, INC., Troy, MI (US)

(72) Inventor: Jon Beauchamp, Hope, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/151,194

(22) Filed: Oct. 3, 2018

(51) Int. Cl.
| F21V 8/00 | (2006.01) |
| G02B 6/04 | (2006.01) |
| F21S 41/24 | (2018.01) |
| F21S 41/29 | (2018.01) |
| F21S 43/27 | (2018.01) |
| F21S 43/245 | (2018.01) |

(52) U.S. Cl.
CPC .............. *G02B 6/001* (2013.01); *F21S 41/24* (2018.01); *F21S 41/29* (2018.01); *F21S 43/245* (2018.01); *F21S 43/27* (2018.01)

(58) Field of Classification Search
CPC ........ G02B 6/001; F21S 43/27; F21S 43/245; F21S 41/29; F21S 41/24
See application file for complete search history.

(56) References Cited

U.S. PATENT DOCUMENTS

| 5,005,108 A * | 4/1991 | Pristash | G02B 6/0005 |
| | | | 362/23.15 |
| 5,321,257 A * | 6/1994 | Danisch | G02B 6/02066 |
| | | | 250/227.16 |
| 6,874,925 B2 * | 4/2005 | Page | G02B 6/0008 |
| | | | 362/554 |
| 7,263,261 B2 | 8/2007 | Henze et al. | |

(Continued)

FOREIGN PATENT DOCUMENTS

| DE | 197 48 636 A1 | 5/1999 |
| DE | 10 2007 016 923 A1 | 10/2008 |

(Continued)

OTHER PUBLICATIONS

International Searching Authority, International Search Report and Written Opinion for corresponding U.S. Appl. No. 16/151,194, dated Jan. 30, 2020.

*Primary Examiner* — Tracie Y Green
(74) *Attorney, Agent, or Firm* — Oblon, McClelland, Maier & Neustadt, L.L.P.

(57) ABSTRACT

A fiber optic light panel assembly including an optical fiber layer including a plurality of optical fibers arranged in a predetermined form such that the optical fiber layer has a light emitting side configured to emit light, and a mounting side opposing the light emitting side. An adhesive layer is provided having a first side in direct contact with the mounting side of the optical fiber layer, and a second side opposing the first side and configured to directly contact a surface of a supporting structure such that the adhesive later mechanically connects the optical fiber layer to the support structure. Also included is a fiber bundle including portions of the plurality of optical fibers that are not in direct contact with the adhesive layer, and abrasions provided along a length of each of the plurality of optical fibers such that light can be emitted from the respective fiber, the abrasion being provided in the optical fiber layer and in at least part of the fiber bundle.

14 Claims, 5 Drawing Sheets

(56) References Cited

U.S. PATENT DOCUMENTS

| | | |
|---|---|---|
| 7,556,412 B2 | 7/2009 | Guillermo |
| 9,354,377 B2 | 5/2016 | York et al. |
| 9,927,087 B1* | 3/2018 | Greene .................. F21S 43/26 |
| 2003/0113082 A1 | 6/2003 | Neuberger |
| 2008/0025039 A1 | 1/2008 | Guillermo |
| 2014/0208562 A1* | 7/2014 | Beier .................. G02B 6/4214 |
| | | 29/407.1 |
| 2015/0062956 A1* | 3/2015 | Genier ................ G02B 6/0006 |
| | | 362/554 |
| 2017/0261670 A1* | 9/2017 | Yamada ............... G02B 6/0008 |
| 2018/0017227 A1* | 1/2018 | Greene ............... G02B 6/0006 |
| 2018/0142860 A1 | 5/2018 | Potter et al. |
| 2019/0078754 A1* | 3/2019 | Beauchamp ............ F21S 41/24 |

FOREIGN PATENT DOCUMENTS

| | | |
|---|---|---|
| EP | 0556450 A1 | 8/1993 |
| WO | 2016059225 A2 | 4/2016 |

* cited by examiner

FIBER OPTIC PANEL HAVING EXTENDED ABRASION

FIELD OF THE INVENTION

This invention relates to lighting systems, and more particularly to a vehicle lighting and/or signaling device that utilizes fiber optic light panels.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common. Vehicle manufacturers must design vehicle lighting devices to meet the technical requirements of government and industry standards around the world.

Vehicle lighting has also become important for its aesthetic appeal to consumers. Thus, vehicle manufacturers have made an effort to design vehicle lighting devices in consideration of the styling of the vehicle on which the lighting devices are mounted. For example, it is desirable for vehicle lighting devices to match the contour of a vehicle, leading to lighting devices with complex shapes. Further, vehicle manufacturers may provide optional lighting effects (in addition to the required lighting functionality) to enhance vehicle styling.

In recent years some vehicle manufacturers are utilizing fiber optic panels in an effort to meet desired lighting and aesthetic characteristics of vehicle lighting. Fiber optic panels generally take the form of very thin panels that output a homogeneous glow that is appealing to consumers. Further, these panels can be mounted to a three dimensional supporting structure and take the contour of a surface of the structure. The present inventors have recognized, however, that integration of fiber optic panels in complex vehicle light devices presents challenges that often result in low manufacturing yield for such vehicle light devices.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY OF THE INVENTION

It is one object of the invention to provide a fiber optic light panel device that can meet the technical and aesthetic requirements for vehicle lighting.

Another object of the invention is to provide a fiber optic light panel device that can conform to three dimensional shapes of a vehicle without degradation of light output.

These and/or other objects may be provided by embodiments of the invention disclosed herein, which include the following aspects.

Aspect (1) is a fiber optic light panel assembly including an optical fiber layer including a plurality of optical fibers arranged in a predetermined form such that the optical fiber layer has a light emitting side configured to emit light, and a mounting side opposing the light emitting side. An adhesive layer is provided having a first side in direct contact with the mounting side of the optical fiber layer, and a second side opposing the first side and configured to directly contact a surface of a supporting structure such that the adhesive later mechanically connects the optical fiber layer to the support structure. Also included is a fiber bundle including portions of the plurality of optical fibers that are not in direct contact with the adhesive layer, and abrasions provided along a length of each of the plurality of optical fibers such that light can be emitted from the respective fiber, the abrasion being provided in the optical fiber layer and in at least part of the fiber bundle.

Aspect (2) includes the fiber optic light panel of Aspect 1, wherein the abrasions are continuously provided along a surface of the fibers that extends beyond the adhesive layer.

Aspect (3) includes the fiber optic light panel of Aspect 2, wherein the abrasions are continuously provided along an entire surface of the fibers.

Aspect (4) includes the fiber optic light panel of Aspect 1, further including a releasing layer in direct contact with the second side of the adhesive layer and configured to be removed when the fiber optic light panel is mounted to a supporting structure.

Aspect (5) includes the fiber optic light panel of Aspect 4, wherein the releasing layer includes a free end to facilitate removal of the releasing layer from the adhesive layer.

Aspect (6) includes the fiber optic light panel of Aspect 1, further including at least one additional optical fiber layer connected to the optical fiber layer by an additional adhesive layer.

Aspect (7) includes the fiber optic light panel of Aspect 6, wherein the optical fiber layer and the additional optical fiber layer are included in an optical fiber portion consisting of three optical fiber layers stacked on top of each other and connected to one another by adhesive layers interposed between the three optical fiber layers.

Aspect (8) includes the a fiber panel lighting assembly including: a support structure having a mounting surface; an optical fiber layer including a plurality of optical fibers arranged in a predetermined form such that the optical fiber layer has a light emitting side configured to emit light, and a mounting side opposing the light emitting side; an adhesive layer having a first side in direct contact with the mounting side of the optical fiber layer, and a second side opposing the first side and configured to directly contact a surface of a supporting structure such that the adhesive later mechanically connects the optical fiber layer to the support structure; a fiber bundle including portions of the plurality of optical fibers that are not in direct contact with the adhesive layer; and abrasions provided along a length of each of the plurality of optical fibers such that light can be emitted from the respective fiber, the abrasion being provided in the optical fiber layer and in at least part of the fiber bundle.

Aspect (9) includes the lighting assembly of Aspect 8, wherein the support structure includes polycarbonate.

Aspect (10) includes the lighting assembly of Aspect 9, wherein the mounting surface of the support structure is a non-planar surface.

Aspect (11) includes the lighting assembly of Aspect 10, wherein the mounting surface of the support structure is a three dimensional surface.

Aspect (12) includes the lighting assembly of Aspect 11, wherein the mounting surface is a two and a half dimensional surface.

Aspect (13) includes the lighting assembly of Aspect 9, wherein the mounting surface is a reflective surface.

Aspect (14) includes the lighting assembly of Aspect 9, wherein the mounting surface is processed to facilitate adhesion.

Aspect (15) includes a vehicle lighting device including: a polycarbonate supporting structure having a non-planar surface; and the fiber optic light panel Aspect 1, wherein the second side of the adhesion portion is in direct contact with the non-planar surface.

The different aspects of the embodiments can be combined together or separately taken.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF SEVERAL EMBODIMENTS

Figure 1:
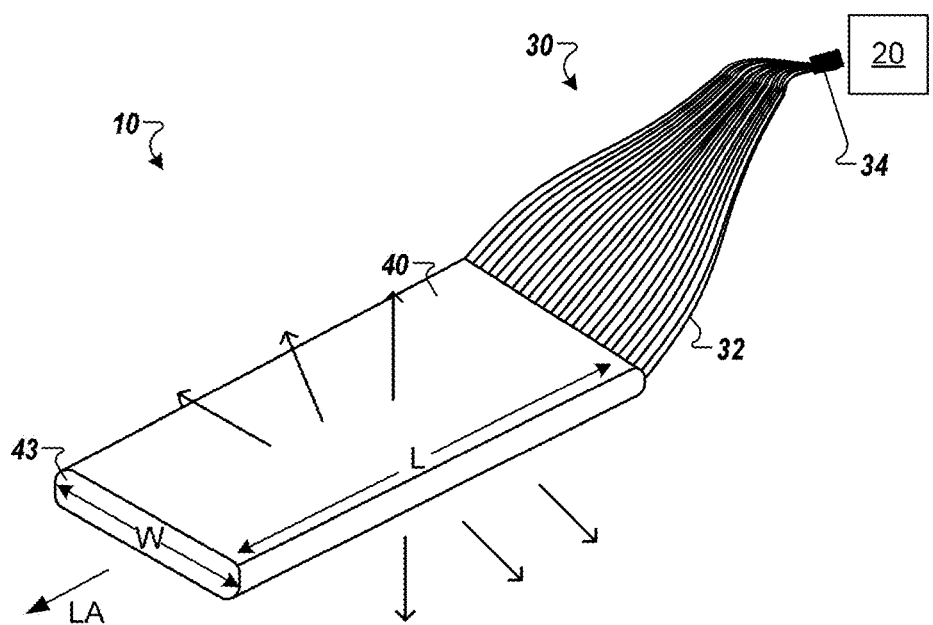
FIG. 1 is a schematic view of a fiber optic light panel device in accordance with embodiments of the invention.

Referring now to the drawings, wherein like reference numerals designate identical or corresponding parts throughout several views, the following description relates to a fiber panel having easy assembly onto complex three-dimensional shapes.

FIG. 1 is a schematic representation of a lighting system in accordance with an embodiment of the invention. The lighting system 10 includes a light source 20, a fiber bundle 30, and a fiber panel 40. The light source 20 generates light for coupling to the fiber panel 40, which emits light from a surface thereof to meet a desired lighting function. The fiber panel 40 may include a cover layer on the top side or bottom side of the fiber panel 40 such as a transmission layer as described further below. The fiber bundle 30 groups fibers of the panel 40 in a configuration suitable for accepting light from the light source 20 into the fiber panel 40.

The light source 20 may be any suitable source for generating light having photometric characteristics to provide a desired light output from panel 40. For example, the light source 20 may provide a lambertian pattern or any other radiation pattern of suitable flux, wavelength and intensity to satisfy the lighting function of the panel 40. Light source 20 may include one or more light emitting devices or solid state light sources. The term "solid state" generally refers to light emitted by solid-state electroluminescence, as distinct from light emitted by a source of incandescence or fluorescence. For example, light source 20 may include an inorganic semiconductor light emitting diode (LED) or laser diode, an organic light emitting diode (OLED), polymer light emitting diode (PLED), an LED lamp package, LED chip or LED die, or an array of one or more of these devices.

It should be understood that the light source 20 could be multiple discrete LEDs or an LED light bar. When a plurality of devices of LEDs is used, the LEDs may have the same or different colors. A conventional printed circuit board (PCB) having one or more LEDs or solid state LEDs could be used with the optical fiber panel 40. Preferable, the light source has a minimum output of 120 lumens. In one example, the light source 20 may be an LED providing approximately 2 W, 140 lm output at 2.65 Volts and 750 mA of current. The light source 20 may be controlled via an operator interface (not shown), and/or may be controlled using a controller such as processor. Further, the light source 20 may include a heat sink (not shown).

The fiber bundle 30 may include a large number of glass or plastic optical fibers 32 that can be bound together at one end by bundling element 34. For example, the fiber bundle 30 may include a large number of abraded PMMA (Polymethyl methacrylate) fibers. The bundling element 34 may be formed from a brass or plastic ferrule, cable tie, tape, adhesive, or other material that can hold the fiber bundle 30 in a predetermined shape. Additional bundling elements may be used. For example, in some embodiments, a bundling element may be provided for each fiber layer of the panel. In one example, the fiber bundle 34 may be coupled to the light source 20 via an optical fiber coupler (not shown). In the drawings, only a small number of optical fibers 32 is shown for simplicity. However, the fiber bundle 30 described herein may include from several tens of fibers to thousands of fibers. In one implementation, the fiber bundle 40 may include approximately between 250 and 350 fibers of 0.25 mm diameter. All or a part of the optical fibers 32 may be extended therefrom to form one or more fiber panels 40.

The fiber optic light panel 40 includes a plurality of optical fibers 32 that generally extend along a length L of the panel 40, terminating at an end 43 of the panel. The fibers 32 are generally arranged in an array along a width W such that they define a generally planar and generally rectangular panel 40. The panel 40 may assume other arrangements and forms. For example, the panel 40 may have a width W that generally exceeds a length L. Further, the panel is flexible and may be fixed to a three-dimensional surface and take the form thereof.

Optical fibers are generally used to transmit light from one end of a fiber to the other end. This mode of operation based on total internal reflection (TIR) is used for lighting and telecommunications, for example. However, optical fibers may also be abraded to emit light from the surface of the fibers. Altering the optical fibers 32 to direct light in a desired direction can be achieved through a variety of methods including, but not limited to, laser ablating a surface of a fiber or mechanical abrasion of a surface of each fiber 32, and the like. Further, depth, density and type of the alterations may be varied along the length of each fiber. For example, spacing between reflective surfaces may be varied in different portions of the fiber to achieve more or less light intensity at the surface of the fiber and/or to permit more or less light to be emitted from an end of the optical fibers 32 and therefore from the fiber panel 40.

The fibers 32 of the fiber panel 40 may be abraded on one side to cause light to come out of opposite single side of the panel, or can be abraded on both sides in order to cause the light to come out of both sides of the fiber panel 40. As shown by the arrows in FIG. 1, fibers 32 are configured to emit light along a respective length of the optical fiber 32, in which the optical fibers are arranged to define two illumination regions diametrically opposite to each other such that light is output from the two illumination regions. A reflective backing may be used to reflect light to a front side of the panel such that light is primarily emitted from one side of the panel 40, as discussed further below.

The fiber panel 40 can be used directly as a lighting function, or as a contributor to a lighting function in conjunction with other lighting function elements (i.e., supplemental). The fiber panel 40 can be used as a light contributor for tail, stop, turn, position, daytime running light (DRL), and sidemarker functions. For example, the fiber panel 40 can be used for signaling functions including a combination turn signal and parking lamp or a combination parking lamp and a daytime running lamp. In one implementation, the fiber panel 40 may be included in a headlamp assembly that includes a high beam headlamp and a low beam headlamp. In another implementation, the fiber panel 40 may be included in a rear lamp assembly. Rear lamp assemblies include a combination brake lamp and tail lamp or a combination tail lamp and a turn signal lamp. Still further, the fiber panel 40 can be used as a controlled light source for secondary optics and/or can be used as a styling element.

Figure 2A:
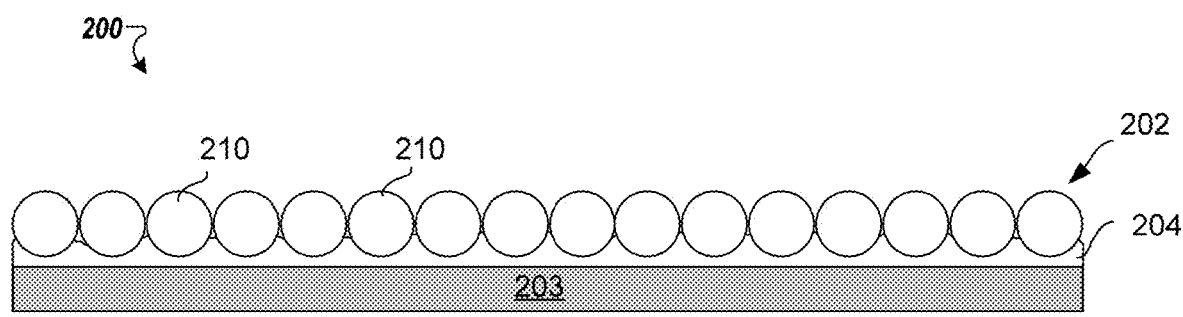
FIG. 2A is schematic view of a cross section of a fiber panel in accordance with embodiments of the invention.

FIG. 2A is a schematic view of a cross section of a fiber panel according to one embodiment. As seen, the panel 200 includes an optical fiber layer 202 joined to a reflecting layer 203 by adhesive layer 204. The fiber layer 202 includes the plurality of fibers 210 arranged side-by-side in an array. The adhesive layer 204 is a continuous layer of optical adhesive in contact with each of the fiber layer 202 and reflecting layer 203 such that these layers are mechanically joined by the adhesive 204. Adhesive layer 204 has a thickness which is minimized to reduce optical losses of light in the panel 200. According to some embodiments, the adhesive layer 204 is greater than 76 micrometers in thickness to improve tolerance of the panel to conform to complex shapes and/or unintended flaws in a surface of a supporting structure. The adhesive layer 204 may be 58-132 micrometers thick, or even thicker to ensure conformal adhesion of the panel 200 to supporting structures. The thickness may be correlated to the complexity of contouring so that conformal adhesion occurs without unnecessary attenuation caused by the adhesive layer 204. In one embodiment, the adhesive layer 205 is Transfer Adhesive 468MP manufactured by 3M Company.

Reflecting layer 203 is configured to reflect light emitted along a length of the optical fibers toward the opposite side of the panel 40. Thus, the fiber panel 200 is configured to have a light output region from one side thereof. Transmission portion 209 is optionally provided on a light emitting side of the panel to achieve various optical effects to light output from the fibers 210. One example of a reflecting layer is a conventional Mylar or Melinex layer having highly diffuse reflective properties.

Figure 2B:
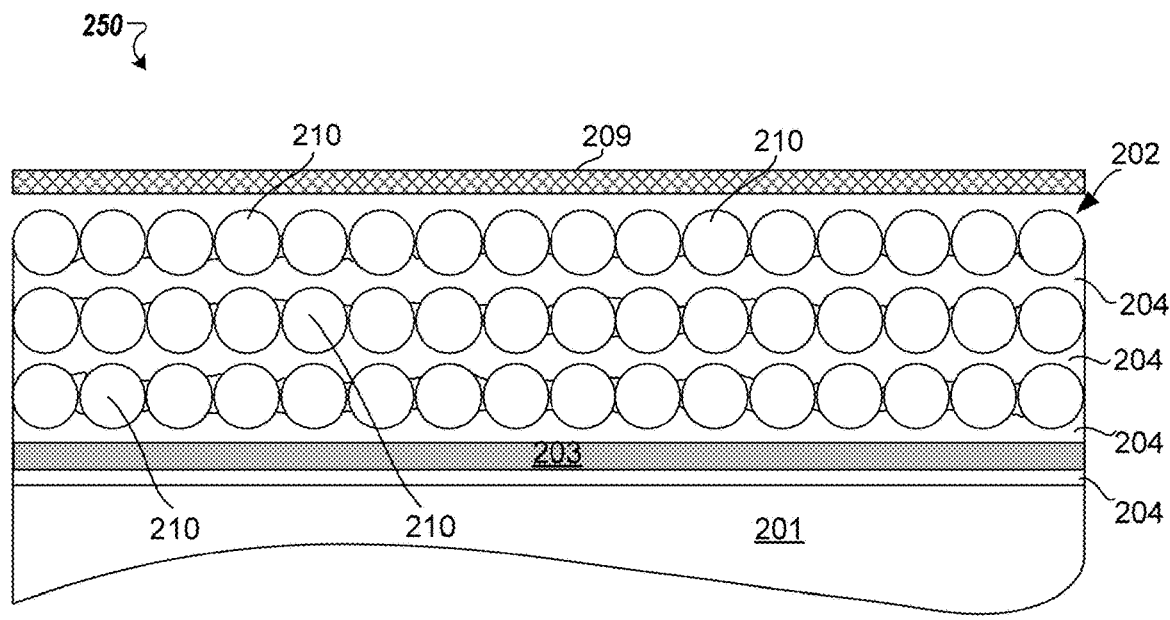
FIG. 2B is schematic view of a cross section of a fiber panel assembly in accordance with embodiments of the invention.

FIG. 2B is a schematic view of a cross section of a fiber panel assembly according to one embodiment. As seen, the fiber panel assembly 250 includes three fiber layers 202 adhered to one another and to a reflecting layer 203 by adhesive layers 204. A further adhesion layer 204 is used to bond the multilayer panel itself to a supporting structure 201. This reduces the risk of detachment of the fiber panel from the structure 201 which may cause deterioration in the light output.

Transmission portion 209 is optionally provided on a light emitting side of the panel to achieve various optical effects to light output from the fibers 210. Transmission portion 209 may have the same or different optical properties to achieve a desired light output/type from illumination region of the panel. Light type can include color, hue, tint, tone, and/or shade of the light output in the illumination region. Transmission portion 209 (schematically shown in FIG. 2B) may be held adjacent to the fiber panel by a separate structure for holding the panel, or may form an integral part of the fiber panel by adhesion to the fiber layer 202 using double sided adhesive tape.

Figure 3:
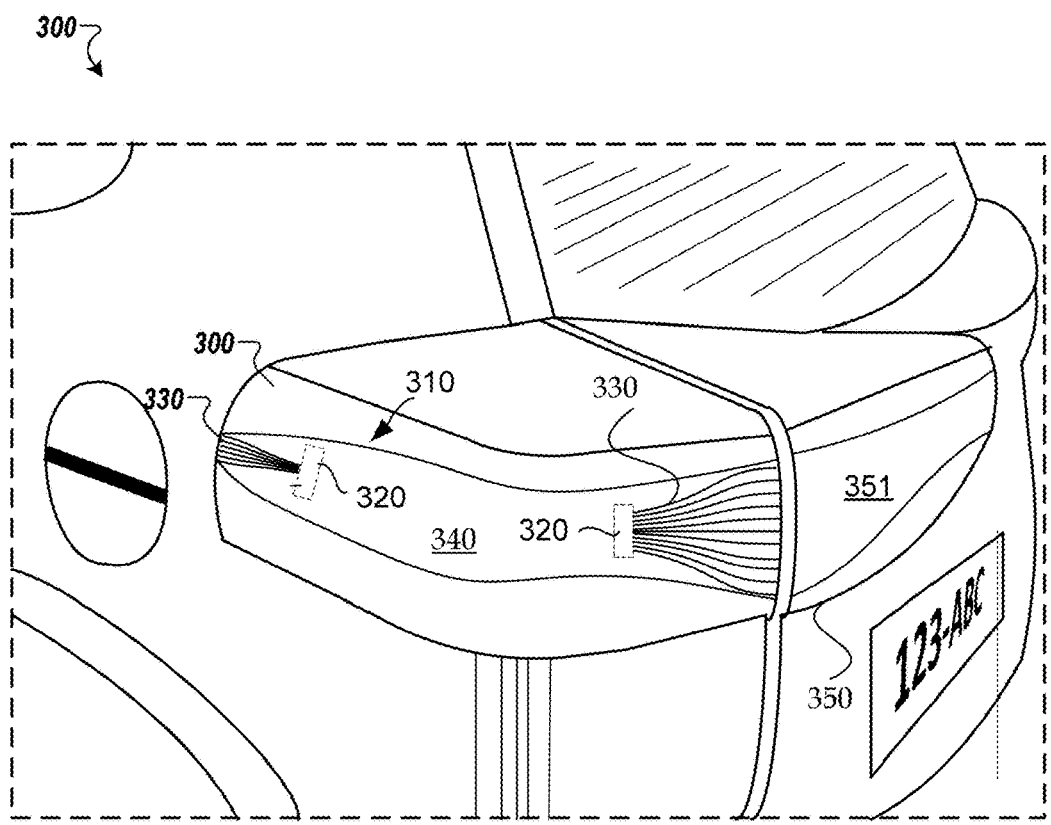
FIG. 3 illustrates an example application for a fiber panel light module according to one embodiment.

FIG. 3 illustrates an example application for a fiber panel light module according to one embodiment. As seen, the figure shows the left rear corner taillight assembly 300 and surrounding area of a vehicle. The taillight assembly 300 includes light sources 320, fiber bundles 330, and a fiber panel 340. The light sources 320 generate light for coupling to the fiber panel 340, which emits light from a surface thereof to meet a desired lighting function. As seen, the light sources 320 are optically coupled to fiber bundles 330 formed by fibers 332 extending from opposing sides of the panel 340. The light sources 313 are shown in phantom to indicate that the sources 320 and related fiber bundles 330 are provided on a back side of the corner taillight assembly 300 within the interior of the vehicle. Additional tail light assembly 350 having optic lighting module panel 351 is also shown, but the fiber bundles and light sources are hidden within the trunk area of the vehicle.

Figure 4:
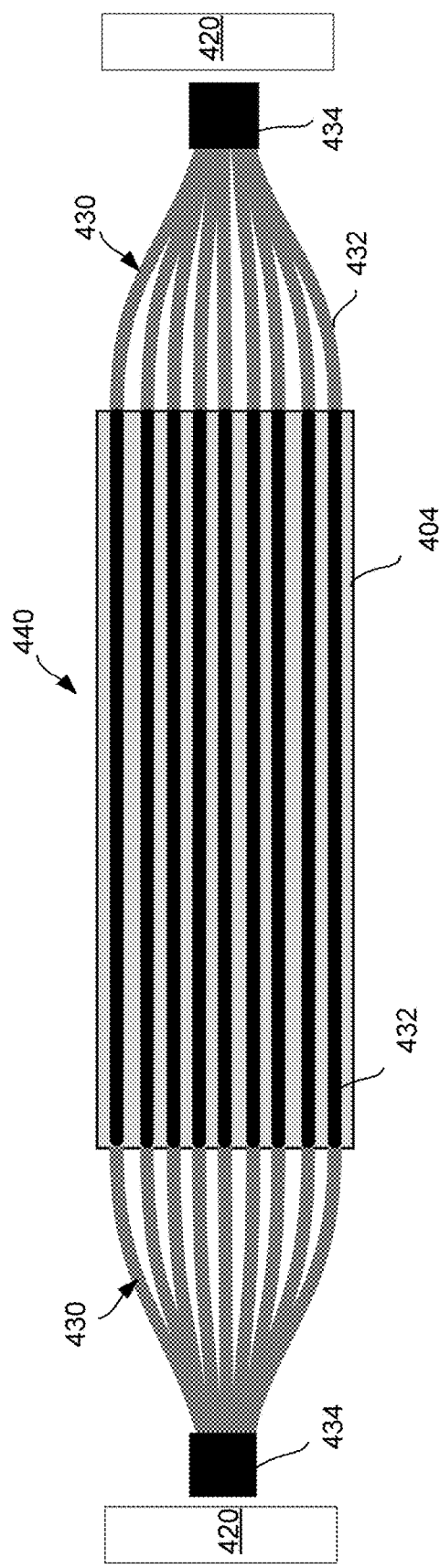
FIG. 4 is a schematic representation of a conventional fiber optic light module used on a tail light assembly.

As discussed in the Background section above, the present inventors have recognized that integration of fiber optic panels in complex vehicle light devices presents challenges that often result in low manufacturing yields for such vehicle light devices. FIG. 4 is a schematic representation of a conventional fiber optic light module used on a tail light assembly such as that shown in FIG. 3. As seen, the module 410 includes light sources 420 optically coupled to fiber bundles 430 extending from opposing sides of a fiber panel 440. Panel 440 includes adhesive 404 which maintains the middle region of the fibers 432 in a panel form, and ferrules 432 provided at the ends of the fibers to maintain the bundles and provide coupling to the light sources 420. The adhesive may be used to fix the panel portion 440 to a supporting structure such as the corner taillight as discussed above.

As also seen in FIG. 4, fibers 432 include an abraded portion in the panel region 440 as shown by the black fill, and non-abraded portions in the bundles 430 as shown by the gray fill. Thus, the conventional fiber optic module includes abraded portions of the fibers which correspond to the adhesive 404 of the panel. This may be due to a manufacturing process of the panel 440 wherein adhesive is fixed to one side of the fibers 432 to maintain the panel shape, and the opposing side of the fibers are abraded after being fixed by the adhesive. An abrupt boundary for the abraded portion causes an abrupt boundary of the light emitted by the abraded portion relative to the non-abraded portion. The present inventors have recognized that a boundary of the adhesive region typically corresponds to the boundary of a visible portion of the support structure to which the panel is fixed. As the abrasion portion on the fiber is constrained to be only in the adhesive region of the panel that is fixed to the visible supporting structure, assembly of the panel by adhesive to the supporting structure requires precise placement of the panel (centering) is crucial to ensure that the abrupt boundary of emitted light is not visible in the finished assembly. The embodiments disclosed herein address this issue.

Figure 5:
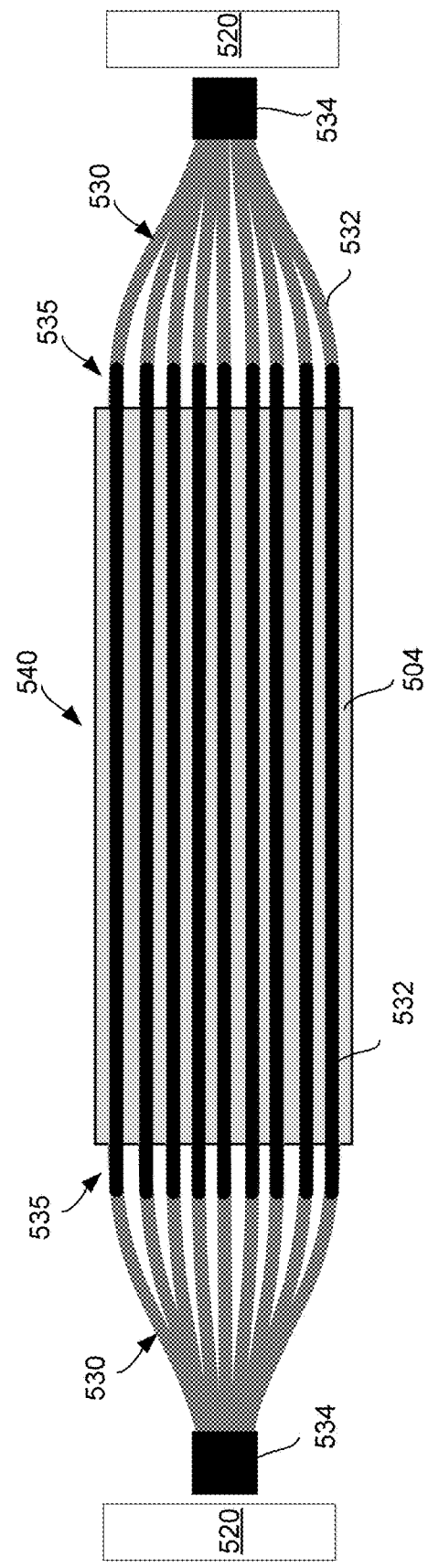
FIG. 5 is a schematic representation of a fiber optic light module used on a tail light assembly according to an embodiment.

FIG. 5 is a schematic representation of a fiber optic light module used on a tail light assembly according to an embodiment. As seen, the module 510 includes light sources 520, fiber bundles 530 and fiber panel 540. As also seen in FIG. 5, the abraded portion of the fibers 532 shown by black fill extends beyond the adhesive 504 in the panel region 540. This allows for greater process variation in panel placement without an observable change in lit aspect in the finished product. Further, the extended abrasions improve the lit to unlit gradient of the assembly.

Figure 6:
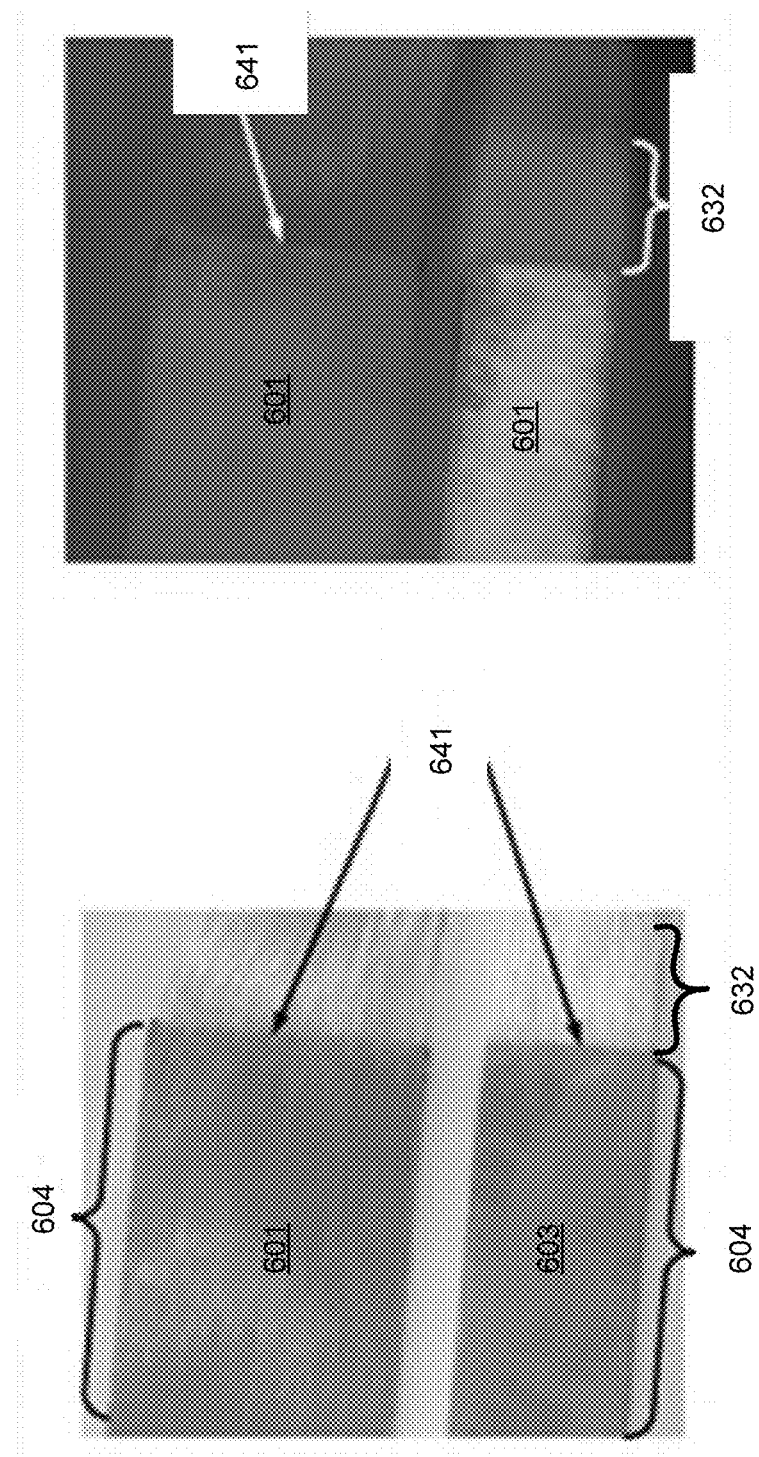
FIG. 6 is a printed image comparing a conventional optical fiber panel with an optical fiber panel according to embodiments disclosed herein.

FIG. 6 is a printed image comparing a conventional optical fiber panel with an optical fiber panel according to embodiments disclosed herein. The left portion of the figure shows a comparison of the fiber panels in an unlit state, while the right side of the figures shows the panel in a lit state. Specifically, as seen at the left side of the figure, a conventional panel 601 is above the extended abrasion fiber panel 603 and the two panels are arranged such that their adhesive regions 604 are aligned. The adhesive regions 604 and define an edge 641 of the panel portion to be fixed to a supporting structure. The panel 601 includes fiber abrasions constrained within the adhesion portion 604, while the panel 603 includes an extended abrasion region 632 that extends into the fiber bundle area. The right side of FIG. shows the effect more clearly. As seen, the panel 601 includes an abrupt change in light output corresponding to the adhesive and abraded region transitioning to a non-adhesive and non-abraded region. By contrast, the panel 601 having extended abrasion region 632, the point at which the lit aspect changes abruptly extends past the adhesive due to the extended abrasions. This allows for an improved light gradient, and also allows the point at which the lit aspect drastically changes to be wrapped around the mounting surface of a lighting device, where it is out of the view of the customer.

Figure 7A:
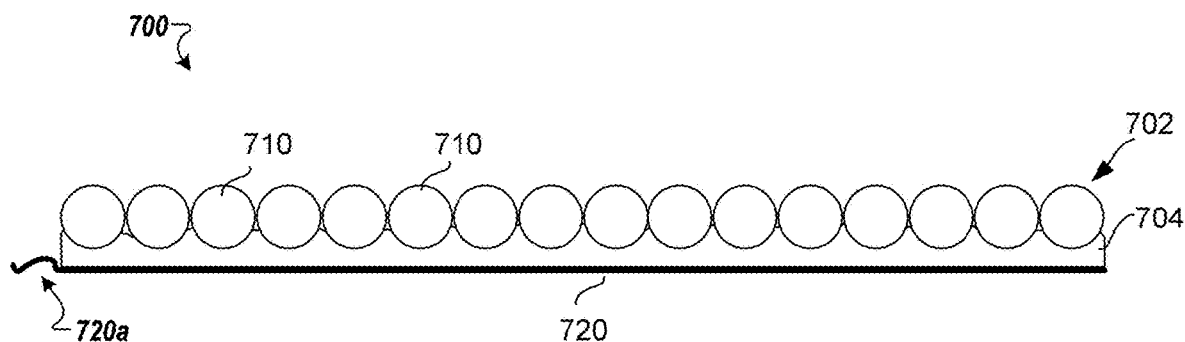
FIG. 7A is a schematic view of a cross section of a fiber panel according to another embodiment.

FIG. 7A is a schematic view of a cross section of a fiber panel according to another embodiment. As seen, the panel 700 includes an optical fiber layer 702 joined to one side of an adhesive layer 704. The fiber layer 702 includes the plurality of fibers 710 arranged side-by-side in an array. The panel 700 does not include a reflecting layer. A removable liner 720 is provided on the adhesive layer 704 to prevent unintended adhesion of the panel 700. A free end 720a permits the liner 720 to be removed from the panel 700 when ready to stick to a supporting structure such as the surface of a complex 3d structure.

Figure 7B:
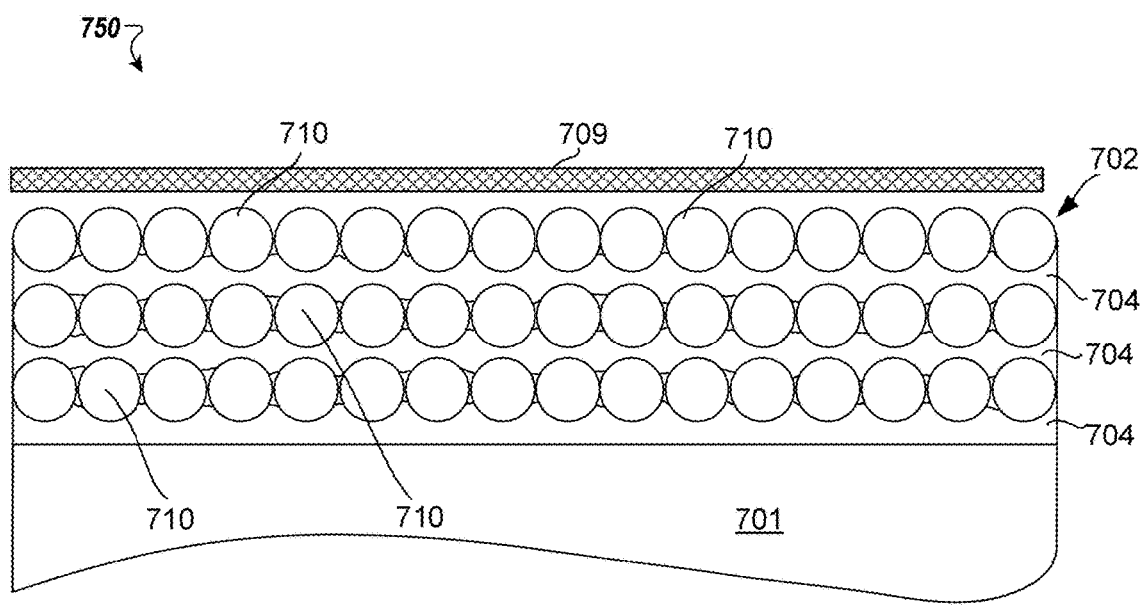
FIG. 7B is a schematic view of a cross section of a fiber panel assembly according to another embodiment.

FIG. 7B is a schematic view of a cross section of a fiber panel assembly according to another embodiment. As seen, the fiber panel assembly 750 includes three fiber layers 702 adhered to one another by adhesive layers 704. Adhesive layer 704 is also used bond the multilayer panel itself directly to a supporting structure 701. This structure reduces the risk of delamination of the fiber panel and/or detachment of the fiber panel from the structure 701 which may avoid deterioration in the light output.

In some embodiments, the supporting structure may be configured to provide optical properties desirable for light panels fixed thereto. For example, the supporting structure may be made from highly reflective polycarbonate. Alternatively, a surface of the supporting structure may be modified to provide improved adhesion of the fiber panel. Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A fiber optic light panel assembly of a vehicle light device, comprising:
    an optical fiber layer comprising a plurality of optical fibers arranged in a predetermined form such that the optical fiber layer has a light emitting side configured to emit light, and a mounting side opposing the light emitting side;
    an adhesive layer having a first side in direct contact with the mounting side of the optical fiber layer, and a second side opposing the first side and configured to directly contact a surface of a supporting structure such that the adhesive layer mechanically connects the optical fiber layer to the support structure;
    a fiber bundle comprising portions of the plurality of optical fibers that are not in direct contact with the adhesive layer; and
    abrasions provided along a length of each of the plurality of optical fibers such that light can be emitted from the respective fiber, said abrasions being provided in the optical fiber layer and extended continuously beyond the adhesive layer into at least part of the fiber bundle in order to extend the light emitted from the respective fiber past the adhesive layer,
    wherein the abrasions are continuously provided along an entire surface of the plurality of optical fibers.

2. The fiber optic light panel of claim 1, wherein the abrasions are continuously provided along a surface of the fibers along the light emitting side that extends beyond the adhesive layer.

3. The fiber optic light panel of claim 1, further comprising a releasing layer in direct contact with said second side of the adhesive layer and configured to be removed when the fiber optic light panel is mounted to a supporting structure.

4. The fiber optic light panel of claim 3, wherein the releasing layer comprises a free end to facilitate removal of the releasing layer from the adhesive layer.

5. The fiber optic light panel of claim 1, further comprising at least one additional optical fiber layer connected to the optical fiber layer by an additional adhesive layer.

6. The fiber optic light panel of claim 5, wherein the optical fiber layer and the additional optical fiber layer are included in an optical fiber portion consisting of three optical fiber layers stacked on top of each other and connected to one another by adhesive layers interposed between the three optical fiber layers.

7. A fiber panel lighting assembly of a vehicle light device, comprising:
    a support structure having a mounting surface;
    an optical fiber layer comprising a plurality of optical fibers arranged in a predetermined form such that the optical fiber layer has a light emitting side configured to emit light, and a mounting side opposing the light emitting side;

an adhesive layer having a first side in direct contact with the mounting side of the optical fiber layer, and a second side opposing the first side and configured to directly contact a surface of a supporting structure such that the adhesive layer mechanically connects the optical fiber layer to the support structure;

a fiber bundle comprising portions of the plurality of optical fibers that are not in direct contact with the adhesive layer; and abrasions provided along a length of each of the plurality of optical fibers such that light can be emitted from the respective fiber, said abrasions being provided in the optical fiber layer and extended continuously beyond the adhesive layer into at least part of the fiber bundle in order to extend the light emitted from the respective fiber past the adhesive layer.

8. The lighting assembly of claim 7, wherein said support structure comprises polycarbonate.

9. The lighting assembly of claim 8, wherein said mounting surface of the support structure is a non-planar surface, wherein the fiber bundle is wrapped around the mounting surface such that the abrasions are extended to a point that is wrapped around the mounting surface.

10. The lighting assembly of claim 9, wherein said mounting surface of the support structure is a three dimensional surface.

11. The lighting assembly of claim 10, wherein said mounting surface is a two and a half dimensional surface.

12. The lighting assembly of claim 8, wherein said mounting surface is a reflective surface.

13. The lighting assembly of claim 8, wherein said mounting surface is processed to facilitate adhesion.

14. A vehicle lighting device comprising:
a polycarbonate supporting structure having a non-planar surface; and
the fiber optic light panel claim 1, wherein said second side of the adhesion portion is in direct contact with the non-planar surface.

* * * * *